(12) United States Patent
Morikawa et al.

(10) Patent No.: US 7,674,858 B2
(45) Date of Patent: Mar. 9, 2010

(54) FLUORINE-CONTAINING GRAFT OR BLOCK POLYMER

(75) Inventors: Tatsuya Morikawa, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1079 days.

(21) Appl. No.: 10/550,389

(22) PCT Filed: Jun. 10, 2004

(86) PCT No.: PCT/JP2004/008114

§ 371 (c)(1),
(2), (4) Date: Sep. 22, 2005

(87) PCT Pub. No.: WO2004/111109

PCT Pub. Date: Dec. 23, 2004

(65) Prior Publication Data

US 2006/0173131 A1     Aug. 3, 2006

(30) Foreign Application Priority Data

Jun. 11, 2003    (JP) .............................. 2003-167185

(51) Int. Cl.
*C08F 8/00* (2006.01)
(52) U.S. Cl. .............................. 525/102; 525/93; 525/94
(58) Field of Classification Search ................. 525/102, 525/93, 94
See application file for complete search history.

(56) References Cited

U.S. PATENT DOCUMENTS

| | | | | |
|---|---|---|---|---|
| 3,024,224 A | * | 3/1962 | Herbst et al. ................. | 526/231 |
| 4,314,043 A | * | 2/1982 | Kojima et al. ................ | 525/102 |
| 4,316,941 A | * | 2/1982 | Eguchi et al. ................ | 428/421 |
| 5,141,991 A | * | 8/1992 | Konno et al. ................. | 525/102 |
| 5,159,004 A | * | 10/1992 | Furuta et al. ................. | 524/390 |
| 5,483,000 A | | 1/1996 | Kaneko et al. | |
| 5,736,250 A | * | 4/1998 | Heeks et al. ................. | 428/447 |
| 7,211,625 B2 | * | 5/2007 | Tsuji et a ....................... | 525/93 |
| 7,226,965 B2 | * | 6/2007 | Hattori et al. ................ | 524/157 |

FOREIGN PATENT DOCUMENTS

| | | |
|---|---|---|
| EP | 0 027 028 A1 | 4/1981 |
| EP | 544265 A1 | 6/1993 |
| EP | 1 595 926 A1 | 11/2005 |
| JP | 56-28219 A | 3/1981 |
| JP | 2-308806 A | 12/1990 |
| JP | 4-180932 A | 6/1992 |
| JP | 5-148400 A | 6/1993 |
| JP | 11-228631 A | 8/1999 |
| JP | 2003-201401 A | 7/2003 |
| JP | 2004-69760 A | 3/2004 |

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

The present invention provides a graft or a block polymer in which a fluorine rubber and a silicone rubber are chemically bonded. The present invention is a graft or a block polymer comprising at least one kind of a silicone rubber segment and at least one kind of a fluorine elastomer segment. Furthermore, it is preferable that a fluorine containing elastomer segment is an elastomer segment comprising vinylidene fluoride or an elastomer segment comprising tetrafluoroethylene and that a silicone rubber segment has a unit of dimethylsiloxane and/or methyl-3,3,3-trifluoropropylsiloxane.

4 Claims, No Drawings

FLUORINE-CONTAINING GRAFT OR BLOCK POLYMER

TECHNICAL FIELD

The present invention relates to a graft or a block polymer comprising at least one silicone rubber segment and at least one fluorine containing elastomer segment, and a curable composition comprising the polymer and a vulcanizing agent.

BACKGROUND ART

Both a silicone rubber and a fluorine rubber are rubbers having oil resistance and heat resistance, and these rubbers have been widely employed in various fields. The silicone rubber is excellent in low temperature resistance, a low degree of hardness, and amine resistance, which are properties which is difficult for the fluorine rubber to improve, and furthermore, with respect to processing, the silicone rubber can be applied to a wide variety of processing such as LIM molding.

On the other hand, due to excellent chemical resistance, solvent resistance and heat resistance, the fluorine rubber shows high reliabilities that the silicone rubber can not obtain and has been employed for applications where other materials can not be employed.

Since these two rubbers have a property of supplementing each other, it is expected that a new material is provided if the rubbers can be composed by blending, alloying and the like, and various composites of these two polymers have been studied heretofore.

For example, it is disclosed that a blended material of an iodine containing fluorine elastomer and a vinyl group containing silicone rubber are crosslinked by using a peroxide (for example, see Japanese Unexamined Patent Publication No. 55-50051). Also, a method of blending a fluorine rubber introduced with a double bond and a silicone rubber and conducting co-crosslinking is disclosed (for example, see Japanese Unexamined Patent Publication No. 06-192524). But excellent properties can not be expected since the two polymers are hard to fully disperse finely and uniformly if two kinds of polymers, which are not compatible, are plainly blended and crosslinked With respect to technology relating to a block or a graft, an elastomer composition which is obtained by dissolving a silicone rubbers in Freon 113 and graft bonding with VdF/HFP is disclosed (for example, see Japanese Unexamined Patent Publication No. 01-240552). But excellent properties can not be expected since a reactive site for the graft is not uniform.

Also, a graft copolymer using tetrafluoroethylene/propylene copolymer for a fluorine rubber is disclosed (for example, see Japanese Unexamined Patent Publication No. 56-28219). But, an excellent vulcanizing property can not be expected since a curing site is an epoxy group, an amino group, an organic acid group or a vinyl group.

Furthermore, a vulcanizing rubber composition in which compatibility of a fluorine rubber and an organopolysiloxane is improved by using an organosiloxane having a particular functional group is disclosed (for example, see Japanese Unexamined Patent Publication No. 04-180930). Although organosiloxane improves compatibility of a fluorine rubber polymer and a silicone, sufficient compatibility can not be expected since the organosiloxane does not contain a component of a fluorine rubber.

The present invention provides a graft or a block polymer in which a fluorine rubber and a silicone rubber are chemically bonded.

DISCLOSURE OF INVENTION

Namely, the present invention relates to a graft or a block polymer comprising at least one kind of a silicone rubber segment and at least one kind of a fluorine containing elastomer segment.

The fluorine containing elastomer segment is preferably an elastomer segment comprising vinyliden fluoride or an elastomer segment comprising tetrafluoroethylene.

The silicone rubber segment preferably has a dimethylsiloxane unit and/or a methyl-3,3,3-trifluoropropylsiloxane unit.

The graft or the block polymer is preferably obtained by reacting a fluorine containing compound with a silicone rubber having at least one amino group, wherein the fluorine containing compound is obtained by polymerizing a fluorine containing monomer with a fluorine compound represented by the formula (1):

(wherein $X^1$ is an iodine atom or a bromine atom, $R_f^1$ is a bivalent fluorine containing alkylene group having 1 to 30 carbon atoms, which can contain an oxygen atom, and $R_1$ is an alkyl group having 1 to 3 carbon atoms.)

Also, the present invention relates to a curable composition comprising the above mentioned polymer and a vulcanizing agent.

BEST MODE FOR CARRYING OUT THE INVENTION

The present invention relates to a graft or a block polymer comprising at least one silicone rubber segment and at least one fluorine containing elastomer segment.

Since the graft or the block polymer of this present invention contains at least one kind of a fluorine containing elastomer segment, the polymer can give a property of a fluorine rubber such as excellent solvent resistance to a curable composition, and the polymer serves as a compatibilizer, which helps micro dispersion effectively in a blend of a fluorine rubber and a silicone rubber.

Examples of processes of preparing the graft or the block polymer comprising at least one silicone rubber segment and at least one fluorine containing elastomer segment are:

(A) a process of polymerizing a fluorine containing compound having a halogen atom at the end of the polymer with at least one kind of a monomer by halogen transfer polymerization and bonding the obtained fluorine containing elastomer and a silicone rubber.

(B) a process of polymerizing a silicone rubber having a halogen atom at the end of the polymer with at least one kind of a monomer by halogen transfer polymerization. The process is not limited thereto.

An example of a process(A) is a process of preparing the graft or the block polymer is a process of reacting a fluorine containing compound having a fluorine containing elastomer segment, which is obtained by polymerizing (halogen transfer polymerization) a fluorine containing compound represented by the following formulas (1):

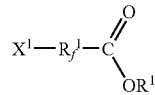
(1)

(wherein $X^1$ is an iodine atom or a bromine atom, $R_f^1$ is a bivalent fluorine containing alkylene group having 1 to 30 carbon atoms, which can contain an oxygen atom, and R1 is an alkyl group having 1 to 3 carbon atoms), or preferably the following formula (2):

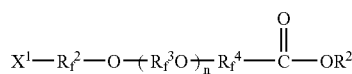
(2)

(wherein $R_f^2$ to $R_f^4$ may be the same or different respectively and are bivalent fluorine containing alkylene groups, $X^1$ is an iodine atom or a bromine atom, $R^2$ is an alkyl group having 1 to 3 carbon atoms, and n is an integer of 0 to 20), with at least one kind of monomer, with a silicone rubber having at least one amino group.

$R_f^1$ is a bivalent fluorine containing alkylene group having 1 to 30 carbon atoms, which can contain an oxygen atom, examples thereof are:

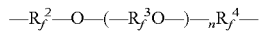

(n and $R_f^2$~$R_f^4$ are the same as above mentioned), —(CF$_2$CF$_2$)$_m$—, —(CH$_2$CF$_2$CF$_2$O)$_1$(CF(CF$_3$)CF$_2$O)$_m$CF(CF$_3$)—, —(CH$_2$CF$_2$CF$_2$O)$_1$CH$_2$CF$_2$—, —(CF$_2$)$_1$(CF(CF$_3$)CF$_2$O)$_m$CF(CF$_3$)—, —(CH$_2$CF$_2$CF$_2$O)$_1$(CF$_2$CF$_2$O)$_m$CF$_2$—, —(CF$_2$CF$_2$CF$_2$O)$_1$(CF(CF$_3$)CF$_2$O)$_m$CF(CF$_3$)—, —CH$_2$CF$_2$CF$_2$O(CH$_2$CF$_2$CF$_2$O)$_n$CH$_2$CF$_2$-(m, l are integers of at least 0), —CF$_2$—, —CF$_2$CF$_2$—, —CH$_2$CF$_2$CF$_2$—, —CF$_2$CF$_2$CF$_2$—, —CF(CF$_3$)—, —CF(CF$_3$)CF$_2$—.

$R_f^2$ to $R_f^4$ are bivalent fluorine containing alkylene groups, preferably a fluorine containing alkylene group having 1 to 5 carbon atoms, and more preferably a fluorine containing alkylene group having 2 to 3 carbon atoms.

Examples of $R_f^2$, $R_f^3$, and $R_f^4$ are —CF$_2$, CF$_2$CF$_2$—, —CH$_2$CF$_2$CF$_2$—, —CF$_2$CF$_2$CF$_2$—, —CF(CF$_3$)—, —CF(CF$_3$)CF$_2$—. Among those, $R_f^2$ is preferably —CF$_2$—, —CF$_2$CF$_2$—, —CH$_2$CF$_2$CF$_2$—, —CF$_2$CF$_2$CF$_2$— in viewpoint of easiness of co polymerization of a fluorine rubber component. $R_f^3$ is preferably —CF$_2$—, —CF$_2$CF$_2$—, —CH$_2$CF$_2$CF$_2$—, —CF(CF$_3$)CF$_2$— in viewpoint of easiness of synthesis, and $R_f^4$ is preferably —CF(CF$_3$)—, —CH$_2$CF$_2$—, —CF$_2$CF$_2$— in viewpoint of easiness of synthesis.

Also, formula (5) represented by the following formula:

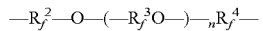

is preferably —CH$_2$CF$_2$CF$_2$O(CH$_2$CF$_2$CF$_2$O)$_n$CH$_2$CF$_2$—, —CH$_2$CF$_2$CF$_2$O(CF(CF$_3$)CF$_2$O)$_n$CF(CF$_3$)-(n is an integer of 0 to 20).

n is an integer of 0 to 20, preferably 0 to 10, and more preferably 0 to 5. When n is more than 10, a compound which does not have halogen tends to generate at synthesis as an impurity.

$X^1$ is preferably an iodine atom or a bromine atom since it is employed in a crosslinking reaction later, but particularly preferably an iodine atom in viewpoint of high reactivity.

Examples of $R^1$ and $R^2$ are a methyl group, an ethyl group and a propyl group, and among those, a methyl group is preferable in view point of easiness of synthesis and high reactivity to amine.

Examples of a compound represented by the formula (1) or the formula (2) are $X^1$—(CH$_2$CF$_2$CF$_2$O)$_1$(CF(CF$_3$)CF$_2$O)$_m$CF(CF$_3$)COOCH$_3$, $X^1$—(CH$_2$CF$_2$CF$_2$O)$_1$CH$_2$CF$_2$COOCH$_3$, $X^1$—(CF$_2$)$_1$(CF(CF$_3$)CF$_2$O)$_m$CF(CF$_3$)COOCH$_3$, $X^1$—(CH$_2$CF$_2$CF$_2$O)$_1$(CF$_2$CF$_2$O)$_m$CF$_2$COOCH$_3$, $X^1$—(CF$_2$CF$_2$CF$_2$O)$_1$(CF(CF$_3$)CF$_2$O)$_m$CF(CF$_3$)COOCH$_3$ ($X^1$ is the same as above mentioned, m and l are integers that are not less than 0), and more specifically, I(CF$_2$CF$_2$)$_n$COOCH$_3$, ICH$_2$CF$_2$COOCH$_3$, ICH$_2$CF$_2$CF$_2$O(CH$_2$CF$_2$CF$_2$O)$_n$(CF(CF$_3$)CF$_2$O)$_m$CF(CF$_3$)COOCH$_3$, ICH$_2$CF$_2$CF$_2$O(CH$_2$CF$_2$CF$_2$O)$_n$CH$_2$CF$_2$COOCH$_3$, ICH$_2$CF$_2$CF$_2$O(CF(CF$_3$)CF$_2$O)$_n$CF(CF$_3$)COOCH$_3$
(wherein both m and n are integers of 0 to 20).

Though there is no particular limitation, a silicone rubber containing at least one amino group is preferably represented by the following formula:

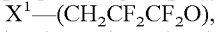 (3)

(wherein $Y^1$ is a silicone rubber, $R^3$ is a hydrogen or an alkyl group having 1 to 3 carbon atoms, a phenyl group or its substituent, and n is an integer of at least one).

Examples of $R^3$ are a hydrogen atom, a methyl group, an ethyl group, a propyl group, and a phenyl group, and among those, a hydrogen atom and a methyl group are preferable in viewpoint of reactivity and chemical stability of amido bonding.

As a silicone rubber, a silicone rubber represented by the following formula:

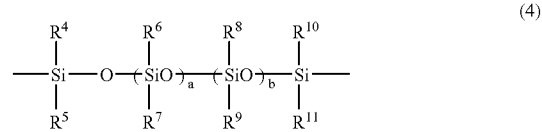 (4)

(wherein $R^4$ to $R^{11}$ may be the same or different respectively and are a hydrogen, an alkyl group having 1 to carbon atoms, an alkenyl group, a saturated or unsaturated fluorohydrocarbon group, a phenyl group or its substituent, a is 0 to 3000, and b is 0 to 3000, $10 \leq a+b \leq 3000$) is preferable Also, a respective repeating unit represented as ($R^6R^7SiO$) and ($R^8R^9SiO$) in the formula (4) is a dimethylsiloxane unit or a methyl-3,3,3-trifluoropropylsiloxane unit represented by the following formula:

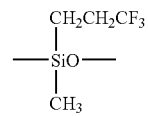

is preferable in viewpoint of heat resistance and chemical resistance of the obtained crosslinked product.

Also, ($R^6R^7SiO$) and ($R^8R^9SiO$) may be a silicone rubber segment in which each block segment is bonded, a silicone rubber segment in which both of them are bonded randomly, and a silicone rubber segment comprising one of the repeated units.

Examples of an alkyl group having 1 to 5 carbon atoms are a methyl group, an ethyl group, a butyl group, examples of an alkenyl group are a vinyl group, and an allyl group, and examples of a saturated or an unsaturated fluorohydrocarbon group are —$CH_2CH_2CF_3$, —$CH_2CH_2CF_2CF_3$, —$CH_2CH_2CF_2CF_2CF_3$, —$CH_2CH_2CF_2CF_2CH=CH_2$, but among those, —$CH_2CH_2CF_3$— is preferable in viewpoint of easiness of synthesis.

In the formula, a is preferably 0 to 3000 and more preferably 10 to 2000.

In the formula, b is preferably 0 to 3000 and more preferably 0 to 2000.

Furthermore, a and b preferably satisfy $10 \leq a+b \leq 3000$, more preferably satisfy $10 \leq a+b \leq 2000$. When a+b is less than 10, properties as a silicone rubber do not tend to appear, and when it is more than 3000, handling tends to become difficult due to high molecular weight.

As an example of a process(B), the graft or the block polymer comprising at least one kind of a silicone rubber segment and at least one kind of a fluorine containing elastomer segment can be obtained by polymerizing (halogen transfer polymerization) at least one kind of monomers with a compound represented by the following formula (5):

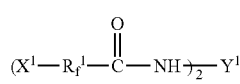

(5)

(wherein $X^1$, $R_f^1$, and $Y^1$ are the same as mentioned above), or a compound represented by the following formula (6):

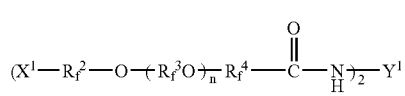

(6)

(wherein $X^1$, $R_f^2$ to $R_f^4$, and $Y^1$ are the same as mentioned above), which are obtained by a reaction of amide formation of a halogen containing compound represented by the formula (1) or (2) with an amino group containing compound represented by the formula (3).

Weight average molecular weight of a fluorine containing compound represented by Formula (5) or (6) is preferably 500 to 500000, and more preferably 1000 to 200000.

Since halogen groups are placed at both ends of the fluorine containing compound represented by the formula (5) or (6), the fluorine containing compound can cure the compound itself and co-vulcanize in blending with a fluorine rubber, and a curable composition having a balanced property can be obtained.

There is not particular limitation for a process of a reaction of amido formation in the process (A) and (B), processes commonly employed can be employed.

Between the process (A) and (B), the process (A) is more advantageous in viewpoint of chain transferability.

Also, a process of halogen transferability in the process (A) and (B) is explained below.

Carbon-halogen bonding is a relatively weak bonding and cleaves as radical in the presence of radical generator. Since reactivity of the generated radical is high, a monomer reacts by addition propagation, thereafter, the reaction stops by drawing out a halogen atom from a halogen compound.

As a process of halogen transfer polymerization, publicly known processes such as bulk polymerization, solution polymerization, suspension polymerization and emulsion polymerization can be adopted. When a process of emulsion polymerization is adopted, examples are a process of seed polymerization described in International Publication No 00/01741 pamphlet and a process of micro emulsion described in Japanese Unexamined Patent Publication No 63-8406 and No62-288609, but are not limited thereto.

In case of conducting halogen transfer polymerization with emulsification polymerization, the emulsion polymerization is conducted by dispersing a compound having a halogen atom at the end of the compound into water with an emulsifier (a part of liquid phase), pressuring with monomer gas which has the same composition as the aimed fluorine containing elastomer segment after replacing a part of gas phase with nitrogen and the like, and polymerizing.

A reaction vessel is composed of this liquid phase and the gas phase comprising monomer gas and polymerization is initiated by injecting polymerization initiator in the reaction vessel. In the course of continuing polymerization, monomers are consumed and added monomers are continued to be supplied since a concentration of the monomer becomes lower in the reaction vessel. Although the amount of the added monomer depends on the composition of the added monomer and an aimed polymer, an amount that keeps a composition of a monomer constant in the reaction vessel at the beginning of polymerization is preferable.

There is no particular limitation for pressure and suitable pressure is adopted.

Furthermore, mixing a part of liquid phase is preferable. As a mean of mixing, an anchor blade, a turbine blade, a slide blade and the like can be employed, but mixing by a great blade called full-zone or max-blend is preferable in viewpoint of diffusion of monomers and excellent dispersion stability of a polymer. As a mixing device, both a horizontal mixing device and a vertical mixing device can be employed.

There is no particular limitation for a polymerization temperature, and the suitable temperature is adopted according to a kind of a polymerization initiator. But if the temperature becomes too high, chain transfer reaction toward a polymer main chain and unstability of an iodine group and the like occur easily, it is possible that the aimed polymer can not be obtained. The temperature is preferably 5 to 120° C. and more preferably 10 to 90° C.

A monomer which forms a fluorine containing elastomer segment by halogen transfer polymerization contains at least one kind of fluoro-olefin, and its comonomer may contain an ethylencally unsaturated compound except for fluoro-olefin.

As a fluoro-olefin employed in the present invention, a fluoro-olefin represented by the formula $CX^2X^3=CX^4X^5$ is preferable. In the formula, $X^2$ to $X^4$ are a hydrogen atom or a halogen atom, $X^5$ is a hydrogen atom, a halogen atom, a carboxyl group, an alkyl group having 1 to 9 carbon atoms in which a part or all of hydrogen are replaced with fluorine atoms, and an alkoxyl group in which a part or all of hydrogen are replaced with fluorine atoms, and the olefin contains at least one fluorine atom.

As the fluoro-olefin represented by the following formula $CX^2X^3=CX^4X^5$, examples are hexafluoropropylene (HFP), vinylidenfluroride (VdF), tetrafluoroethylene (TFE), trifluoroethylene, pentafluoropropylene, vinylfluroride, hexafluoroisobutene, chlorotrifluoroethylene (CTFE), trifluoropropylene, tetrafluoropropylene, and perfluoro (alkyl vinyl ether) (PAVE).

Examples of the above mentioned perfluoro (alkyl vinyl ether) are perfluoro (methyl vinyl ether) (PMVE), perfluoro (ethyl vinyl ether) (PEVE), and perfluoro (propyl vinyl ether) (PPVE).

Also, examples of the fluoro-olefin except for $CX^2X^3=CX^4X^5$ are polyfluorodienes such as $CF_2=CFOCF_2CF=CF_2$, $CF_2=CFCF=CF_2$, and $CF_2=CFCF_2OCF=CF_2$, a fluoro-olefin containing a functional group represented by the following formula:

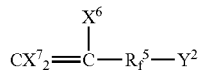
(7)

(wherein $Y^2$ is $-CH_2I$, $-OH$, $-COOH$, $-SO_2F$, $-SO_3M$ (M is hydrogen, a $NH_4$ group or an alkali metal), a carboxylate, a carboxyester group, an epoxy group, a cyano group, and an iodine atom, $X^6$ and $X^7$ are the same or different and both of them are hydrogen atoms or fluorine atoms, and $R_f^5$ is a bivalent fluorine containing alkylene group having 0 to 40 carbon atoms and may contain an ether bonded oxygen atom), or the compound represented by the following formula:

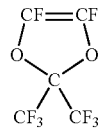

Fluoro-orefin containing a functional group is preferable as a functionality monomer for surface reforming and increasing a crosslinking density, and polyflorodienes are preferable in viewpoint of efficiency of crosslinking.

Examples of the fluoro-olefin containing a functional group are compounds represented by the following formulas:

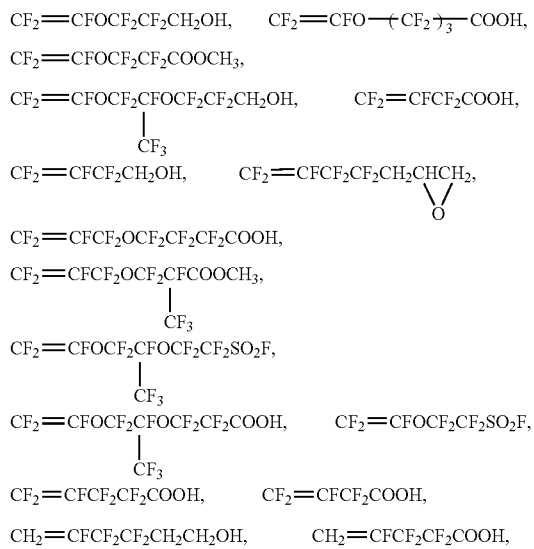

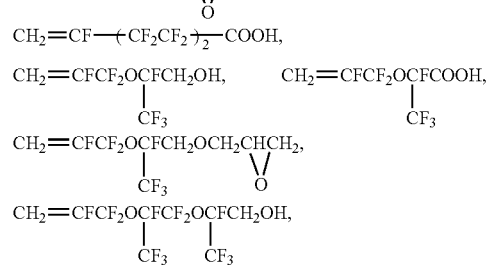

and compounds represented by the following formulas (13):

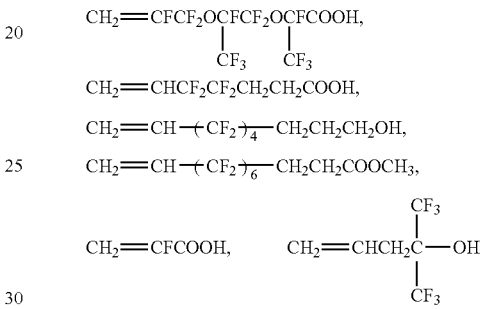

Also, a monomer represented by the formula, $CF_2=CFOCF_2CF_2CH_2I$, which is disclosed in Japanese Unexamined Patent Publication No. 62-12734 as a fluoro-olefin containing a functional group, is preferable for the purpose of increasing density of crosslinking.

Examples of the ethylenically unsaturated compound except for fluoro-olefin are an α-olefin monomer having 2 to 10 carbon atoms such as ethylene(ET), propylene, butene, and pentene, and alkyl vinyl ether, having 1 to 20 carbon atoms of an alkyl group, such as methyl vinyl ether, ethyl vinyl ether, propyl vinyl ether, cychlohexyl vinyl ether, hydroxybutyl vinyl ether, and butyl vinyl ether, but the compound is not particularly limited thereto.

A combination of monomers forming the fluorine containing elastomer segment of the polymer of the present invention is preferably at least one kind of fluoro-olefin represented by the formula $CX^2X^3=CX^4X^5$ in viewpoint of a property of a cured product crosslinke the obtained curing the obtained polymer.

A fluorine containing elastomer segment of the polymer of the present invention is preferably an elastomer comprising VdF or an elastomer comprising TFE, and more preferably VdF/HFP, VdF/TFE/HFP, VdF/TFE/PMVE or TFE/PMVE in viewpoint of heat resistance and chemical resistance.

Weight average molecular weight of the graft or the block polymer of the present invention obtained by halogen transfer polymerization is preferably 1000 to 500000, more preferably 2000 to 200000. When weight average molecular weight is less than 1000, curing does not tend to progress sufficiently. When it is more than 500000, the polymer does not tend to be processed due to a high viscosity.

Molecular weight distribution (weight average molecular weight Mw/number average molecular weight Mn) is preferably 1 to 8. When molecular weight distribution is more than 8, it is possible that properties become low since differences of molecular weight of a fluorine rubber segment and a silicone rubber segment is large.

Also, the weight ratio of a silicone rubber segment and a fluorine containing elastomer segment is preferably 1/99 to 99/1, and more preferably 10/90 to 90/10. When the ratio of the silicone rubber segment is less than 1/99, the polymer hardly show properties of a silicone rubber and does not tend to reveal effects in case of using as a compatibilizer. When the ratio is more than 99/1, improving a property by introducing a fluorine rubber can not be expected.

Also, a content of a halogen atom in the polymer of the present invention obtained by halogen transfer polymerization is preferably 0.1 to 10% by weight, and more preferably 0.2 to 8% by weight. When the content rate of a halogen atom is less than 0.1% by weight, vulcanization is not sufficient at vulcanizing and a compression permanent strain tends to be lowered, and when the rate is more than 10 weight %, crosslinking density is too high and efficiency as a rubber tends to be degraded, such as too small elongation.

As a polymerization initiator used in halogen transfer polymerization, an oil soluble radical polymerization initiator or a water soluble radical initiator can be used.

As an oil soluble radical polymerization initiator used in the present invention, a commonly known oil soluble peroxide is used and representative examples are dialkylperoxy carbonates such as diisopropylperoxy dicarbonate and di-sec-butylperoxy dicarbonate, peroxy esters such as t-butyl, peroxyisobutylate and t-butylperoxypivarate and dialkyl peroxides such as di-t-butyl peroxide, and also di[perfluoro(or fluorochloro)acyl]peroxides such as di(ω-hydro-dodecafluoroheptanoyl)peroxide, di(ω-hydro-tetradecafluorooctanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl) peroxide, di(ω-chloro-decafluorohexanoyl)peroxide, di((ω-chloro-tetradecafluorooctanoyl)peroxide, (ω-hydro-dodecafluoroheptanoyl-(ω-hydrohexadecafluorononanoyl-peroxide, ω-chloro-hexafluorobutyl-ω-chloro-decafiluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotriacontafluorodocosanoyl)peroxide.

However, a soluble radical polymerization initiator is preferably used since peroxycarbonates such as diisopropyl peroxycarbonate (IPP) and di-n-propylperoxicarbonate (NPP) which are typical oil soluble initiators, have a risk of explosion, are expensive, and they have a problem that scales on the wall in the polymerization vessel are generated easily during a polymerization reaction.

As an water soluble radical polymerization initiator, a commonly known water soluble peroxide is usually used and examples are ammonium salts, potassium salt, and sodium salt such as persulfuric acid, perboric acid, perchloric acid, perphosphoric acid, and percarbonic acid, t-butylpermalate, and t-butylhydroperoxide.

An amount of a water soluble radical initiator is more than an amount (for example, several ppm against water concentration) which does not diminish the polymerization speed remarkably, and the amount is added all at once at the beginning of polymerization, or added successively, or continuously, but is not particularly limited thereto. The higher limit is within a range which can remove polymerization reaction heat from the surface of the device.

In the preparing process of the present invention, an emulsifier, a molecular weight regulator, a pH regulator and the like can be added. The molecular weight regulator can be added at once in the beginning or added continuously or separately.

As the emulsifier, a nonionic surfactant, an anionic surfactant, a cationic surface-active agent and the like can be used, and particularly fluorochemical anionic surfactant such as perfluorooctanoic acid ammonium is preferable. An amount (against polymer water) is preferably 50 to 5000 ppm.

Examples of a molecular weight regulator are isopentane, isopropanol, acetone, various mercaptan, carbon tetrachloride, cyclohexane, monoiodomethane, 1-iodoethane, 1-iodo-n-propane, isopropyl iodide, diiodomethane, 1,2-diiodoethane, and 1,3-diiodo-n-propane, Other than esters such as malonic acid dimethyl, malonic acid diethyl, acetic acid methyl, acetic acid ethyl, acetic acid butyl, and succinic acid dimetyl but are not preferably used to the utmost since a blockade ratio by a functional group such as a halogen group and alkylester group at the end of the polymer becomes low.

Other then the above, buffers and the like can be added suitably, but the amount is within the range which does not lose efficiency of the present invention.

The polymer of the present invention obtained by halogen transfer polymerization can be vulcanized effectively, since it has halogen groups at the end of the main chain and/or the side chain and the halogen at the end becomes an effective curing point.

Also, a functional group can be introduced at the end of the main chain and/or the side chain by reacting the above mentioned polymer having halogen groups at the end of the main chain and/or the side chain ,which is obtained by halogen transfer polymerization, with thiol metal represented by the formula (8):

$$M\text{-}S\text{---}R^{12}\text{---}(X^8)_m \qquad (8)$$

(wherein $X^8$ is the same or different, and —OH or a hydrocarbon group having 2 to 10 carbon atoms and at least one unsaturated bond, $R^{12}$ is an organic group of at least two valence or a direct bond, M is alkali metal, and m is an integer of 1 to 3.)

$R^{12}$ is an organic group of at least two valence or a direct bond, and examples of an organic group of at least two valence are an alkylene group having 1 to 10 carbon atoms such as a methylene group, an ethylene group, and a propylene group, an aromatic hydrocarbon group having 6 to 20 carbon atoms such as a phenylene group and a naphthilene group, and an aralkylene group such as —$C_6H_4CH_2$—.

M is an alkali metal such as lithium (Li), sodium (Na), or potassium (K).

Also, as conditions for a reaction, appropriate conditions can be selected suitably by a fluorine containing elastomer, thiol metal, and a kind of a solvent, but are not limited thereto.

The curing composition of the present invention comprises the above mentioned polymer obtained by halogen transfer polymerization and/or a polymer introduced with a functional group, which is obtained by reacting the polymer with thiol metal represented by the formula (8), and a vulcanizing agent.

A vulcanizing agent possibly used in the present invention can be selected by an adopted vulcanizing system suitably. As the vulcanizing system, a polyamine vulcanizing system, a polyol vulcanizing system and a peroxide vulcanizing system can be used, but particularly when vulcanizing by a peroxide vulcanizing system, effects of the present invention are revealed remarkably.

As a vulcanizing agent, an example of a polyol vulcanizing system is a polyhydroxy compound such as bisphenol AF, hydroquinone, bisphenol A, or diaminobisphenol AF, an example of a peroxide vulcanizing system is an organic peroxide such as α,α'-[bis(t-butylperoxy)diisopropyl]benzene, 2, 5-dimethyle-2,5-di(t-butylperoxy)hexane, or dicumylperoxide, and an example of a polyamine vulcanizing system is a polyamine compound such as hexamethylenediaminecarbamate, and N,N'-dicinnamyliden-1,6-hexamethylenediamine, but are not limited thereto.

Among those, 2,5-dimethyle-2,5-di(t-butylperoxy)hexane is preferable in viewpoint of vulcanization and handling.

An amount of a vulcanizing agent is 0.01 to 10 parts by weight, preferably 0.1 to 5 parts by weight, based on 100 parts by weight of the graft or the block polymer. When the amount of the vulcanizing agent is less than 0.01 part by weight, a property of a shaped article tends to be lowered since a degree of vulcanization is in short, and when the amount of the vulcanizing agent is more than 10 parts by weight, and the amount tends not to be economically preferable as well as the long vulcanizing time due to the high vulcanizing density.

As a vulcanizing assistant of a polyol vulcanizing system, organic salt commonly used for vulcanizing an elastomer such as various quarterly ammonium salts, quarternary phosphonium salt, cyclic amine, or one functional amine compound can be employed. Concrete examples are quarternary ammonium salt such as tetrabutylammonium bromide, tetrabutylammonium chloride, benzyltributylammonium chloride, benzyltriethylammonium chloride, tetrabutylammonium hydrogen sulfate, or tetrabutylammonium hydroxide, quarterly phosphonium salt such as benziltriphenylphosphonium chloride, tributylallylphosphonium chloride, tributyl-2-methoxypropylphosphonium chloride, or benzylphenyl(dimethylamino)phosphonium chloride, one functional amine such as benzylmethyanolamine or benzylethanolamine, and cyclic amine such as 1,8-diazabicyclo[5.4.0]-undeca-7-en.

Examples of a vulcanizing assistant are triallylcyanurate, triallylisocyanurate(TAIC), tris(diallylamine-s-triazine), triallylphosphite, N,N-diallylacrylamide, hexaallylphosphoramide, N,N,N',N'-tetraallyltetraphthlamide, N,N,N',N'-tetraallylmaronamide, trivinylisocyanurate, and 2,4,6-trivinylmethyltrisiloxane, tri(5-norbornene-2-methyne) cynurate. Among those, triallylisocyanurate(TAIC) is preferable in viewpoint of vulcanization and properties of vulcanizate.

An amount of the vulcanizing assistant is 0.01 to 10 parts by weight based on 100 parts by weight of the graft or the block polymer, and preferably 0.1 to 5.0 part by weight. When the vulcanizing assistant agent is less than 0.01 part by weight, vulcanizing time tends to become long enough not to stand for practical use, and when the vulcanizing assistant agent is more than 10 parts by weight, compression permanent strain tends to become low as well as too short vulcanizing time.

Also, a compound having at least two Si—H groups in one molecule is preferable in the viewpoint of an ability to form a three dimentional mesh structure by hydrosilylic reaction in case of a polymer introduced with a hydrocarbon group having at least one unsaturated bond and 2 to 10 carbon atoms as a functional group, according to a thiol metal represented by the formula (8), as a vulcanizing agent.

Also, in case of a hydrosilylic reaction of a compound having at least two Si—H groups in one molecule with a polymer introduced with a hydrocarbon group having at least one unsaturated bond and 2 to 10 carbon atoms as a functional group, according to a thiol metal represented by the formula (8), a catalyst for hydrosilylic reaction such as an addition reaction catalyst (a 8th group metallic compound such as) comprising elements of the platinum group such as a catalyst of the platinum series, palladium series, and rhodium series and/or a reaction inhibitor is used preferably.

In case of the polymer introduced with -OH group as a functional group, according to the thiol metal represented by the formula (8), acid anhydride is preferably used as a vulcanizing agent. Examples of acid anhydrate are pyromellitic acid anhydrate, tetrahydrofrantetracarboxylic acid anhydride, and benzophenonetetracarboxylic acid anhydride, examples of a polyamine compound are polyamine such as hexamethylenediamine, triethylenetetramine, or triethylenediamine, and examples of a polyisocyanate compound are tolylendiisocyanate, diphenylmethanediisocyanate, and hexamethylenediidocyanate. The above mentioned polyisocyanate compound can be a block form which can select a prepolymer and the crosslinking temperature. Examples of the curing agent are polycarboxylic acid such as adipic acid, and alkoxymethylmelamine such as methoxymethylmelamine.

In case that the polymer of the present invention has an —OH group and is also an fluorine containing elastomer in vinylidene series, the polyol crosslinking system can be used preferably.

Furthermore, a filler, a processing aid, carbon black, an inorganic filler, metal oxide such as magnesium oxide, and metal hydroxide such as calcium hydroxide, which are common additive, can be used for the present invention, as long as the purpose of the present invention is not impaired.

There is no particular limitation for a process of adjusting and vulcanizing the composition, and conventional processes publicly known such as compression molding, extrusion molding, transfer molding, and emission molding can be adopted.

Tensile elongation at break (Eb) of a shaped form of a vulcanized fluorine containing elastomer by using a vulcanizing agent is preferably 50 to 500%. When the tensile elongation at break is less than 50%, the form does not tend to be suitable for a seal material, losing so-called "properties of a rubber", and when Eb is more than 500%, compression permanent strain (CS) tends to be degraded since crosslinking density becomes too low.

Also, compression permanent strain of shaped article after 72 hours at 200° C. is preferably 10 to 50%, and more preferably 10 to 30%. When the compression permanent strain is more than 50%, properties of a seal material tend to be degraded.

Vulcanization conditions at the above mentioned measurement are the standard amount and the standard vulcanization condition described below:

(Standard amounts)

| Polymer | 100 parts by weight |
|---|---|
| Triallylisocyanurate | 4 parts by weight |
| Perhexa 25B | 1.5 parts by weight |
| Carbon black MT-C | 20 parts by weight |

(Standard vulcanizing conditions)

Kneading process: Roll kneading

Press vulcanization: 10 minutes at 160° C.

Oven vulcanization: 4 hours at 180° C.

The graft or the block polymer of the present invention having at least one kind of a silicone rubber segment and at least one kind of a fluorine elastomer segment obtained by conducting halogen transfer polymerization can obtain a polymer in which both segments are uniform by chemically bonding both of bad compatible segments. Furthermore, the polymer is excellent in chemical resistance, low-temperature resistance and the like.

The polymer obtained by the present invention can give a curable compound by adding a crosslinking agent to the polymer itself, and is employed as a compatibilizer which improves compatibility by adding it in blending fluorine and a silicone rubber.

A shaped article of the present invention is employed in fields represented below.

In the related field of semiconductors such as a semiconductor manufacturing device, a liquid crystal panel manufacturing device, a plasma panel manufacturing device, plasma address liquid crystal panel, a field emission display panel and a substrate of a solar battery, examples are an O (square) ring, a packing, a seal material, a tube, a roll, a coating, a lining, a gasket, a diaphram, and a hose, and these can be used for a CVD device, a dry etching equipment, a wet etching equipment, an oxidization dispersion diffuser, a sputtering equipment, an ashing equipment, a wet scrubber, an ion implanter, an exhauster, a chemical fitting, and a gas fitting. Concretely, examples are used as an O-ring and seal material for a gate bulb, an O ring and a seal material for a quartz window, an O ring and seal material for a chamber, an O ring and a seal material for a gate, an O ring and a seal material for a bell jar, an O ring and a seal material for a coupling, an O ring, a seal material, a diaphragm for a pump, an O ring and seal material for a semiconductor gas regulator, an O ring and seal material of a resist solution and a pealing solution, a hose and a tube for a wafer washing solution, a roll for a wafer transport, a lining and a coating for a resist solution vessel and a pealing solution vessel, a lining and a coating for a wafer washing vessel or a lining and a coating for a wet etching vessel. Furthermore, examples are used for a sealant-sealing agent, a coating of quartz for a optical fiber, an electric components for the purpose of insulation, vibration proof, water proof and damp proof, a potting, a coating and an adhesive seal for a circuit board, gasket for magnetic storage, a modifier for a sealant material such as epoxy and a sealant for a clean room-clean facility.

In the field of automobiles, a gasket, a shaft seal, a valve stem seal, a sealing material or a hose can be employed for an engine and peripheral equipment, a hose and a sealing material is used for an AT equipment, an O (square) ring, a tube, a packing, a core material of a valve, a hose, a sealing material and a diaphragm can be employed for a fuel system and peripheral equipment. Concretely, examples are an engine head gasket, a metal gasket, a sump gasket, a crank shaft seal, a cam shaft seal, a valve stem seal, a manifold packing, an oil hose, a seal for a fuel pump, an ATF hose, an injector O ring, an injector packing, a fuel pump O ring, a diaphragm, a fuel hose, a crank shaft seal, a gear box seal, a power piston packing, a seal for a cylinder liner, a seal for a valve stem, a front pump seal of an automatic shaft, a rear accelerator pinion seal, a gasket of an universal joint, a pinion seal of a speedometer, a piston cup of a foot brake, an O ring of torque transmission, an oil seal, an autoexhaust a seal for a reheating equipment, a bearing seal, an EGR tube, a twin carb tube, a diaphragm for the sensor of a carburetor, a vibration-proof rubber (an engine mount, an exhaust out-let), a hose for an reheating equipment, and an oxygen sensor bush.

In the field of aircraft, rockets and, ships and vessels, examples are a diaphragm, an O (square) ring, a valve, a tube, a packing, a hose, and a sealing material, and these can be employed for a fuel system. Concretely, in the field of an aircraft, a jet engine valve stem seal, a fueling hose, a gasket and an O ring, a rotating shaft seal, a gasket of a hydraulic machine, and a seal for a fire resisting wall, and in the field of ships and vessels, examples are a shaft stern seal for a propel, a valve stem seal for a breather of a diesel engine, a valve seal of a butterfly valve, and a seal for a shaft of a butterfly valve.

In the field of chemical products such as a plant, examples are a lining, a valve, a packing, a roll, a hose, a diaphragm, an O (square) ring, a tube, a sealing material, and a chemical resistance coating, and these can be employed for processes of manufacturing chemicals such as medicine, agricultural chemicals, and coating, plastic. Concretely, examples are a seal of a pump for chemicals, a flow indicator and a pipe, a seal of heat exchanger, a packing for a glass condenser of sulfuric acid manufacturing equipment, a seal of a spray plane and an agricultural chemicals transport pump, a seal of gas piping, a seal for a plating solution, a packing of a high temperature vacuum dryer, a koroseal of a belt for paper manufacturing, a seal of a fuel battery, a joint seal of wind channel, a trichlene resistance roll (for fiber dyeing), an acid resistance hose (for concentrated sulfuric acid), a packing of a tube connecting part of gas chromatography and a pH meter, a chloride gas transport hose, a rain water drain hose of a benzene or toluene storage tank, and a seal, a tube, a diaphragm and a valve of an analytical equipment and a physical and chemical equipment.

In the field of chemicals such as medical drugs, the shaped article of the present invention is employed as a plug for chemicals.

In the field of photography such as a developing equipment, in the field of printing such as printing machinery, and in the field of coating such as coating facility, an example is a roll, and each of them is employed as a roll for a film developing machine-an X-ray film developing machine, a printing roll and coating roll. Concretely, examples are a developing roll of a film developing machine-an X-ray film developing machine, a gravure roll and a guide roll of a printing roll, a gravure roll of a magnetic tape manufacture coating line of a coating roll, a guide roll of a magnetic tape manufacture coating line, and various coating rolls. Furthermore, examples are a seal of a xerography machine, a printing roll, a scraper, a tube and a part of a valve of a printing equipment, a coating roll, a scraper, a tube, and a part of a valve of coating facility, an ink tube, a roll and a belt of a printer, a belt and a roll of a xerography machine, and a roll and a belt of a printing machine.

Also, a tube can be used in the field of analytical-physical and chemical equipment.

In the field of food plants, examples are a lining, a valve, a packing, a roll, a hose, a diaphragm, an O (square) ring, a tube, a seal material and a belt, and these can be used in a process of manufacturing food. Concretely, examples are used as a seal for a plate heat exchanger and a seal of an electric magnetic valve for a vending machine.

In the field of atomic power plant equipment, examples are a packing, an O ring, a hose, a seal material, a diaphragm, a valve, a roll and a tube.

In the field of iron and steel such as an iron plate processing facility, an example is a roll and is used for a roll for an iron plate processing and the like.

In the field of general industries, examples are a packing, an O ring, a hose, a seal material, a diaphragm, a valve, a roll, a tube, a lining, a mandrel, an electric cable, a flexible joint, a belt, a rubber plate, a weather strip, and a roll, a roll blade and a belt for a PPC copying machine. Concretely, a seal of a hydrauric, lubricating machine, a bearing seal, a seal for a window and other parts of a dry cleaning equipment, a seal for an uranium hexafluoride condenser, a seal (vacuum) valve for a cyclotron, a seal for an automatic packaging machine, a diaphragm for a sulfurious acid gas and chlorine gas analytical pump (a pollution finder), a roll, a belt and a roll of an acid cleaning aperture for a printing machine.

In the field of electricity, concretely, examples are an insulating oil cup for a bullet train, a benching seal for a liquid ring trance, and a jacket for an oil well cable.

In the field of fuel batteries, concretely, examples are used for electrodes, a seal material between or between separators, and a seal for a hydrogen-oxygen-purified water pipe.

In the field of electric components, concretely, examples are used for a modifier for a print circuit board pre-preg plastic such as an epoxy and a raw material of an electromagnetic waves shield material and a shatterproof material such as a bulb, and a gasket for a hard disc drive of a computer.

Particularly, examples are used for a gasket, a seal material and a hose, an O (square) ring, a tube, a packing, a core material for a valve, a seal material and a diaphragm, which are employed for a fuel system of an automobile, due to an excellent fuel oil resistance.

The present invention is explained with examples in the following, but the present invention is not limited to the examples.

Evaluation Method

<Weight Average Molecule Weight(Mw) and Number Average Molecule Weight (Mn)>
Equipment: HLC-8020 (made by TOSOH CORP.)
Column available from Showa Denko K.K.: GPC KF-806M 2
  GPC KF-802 1
  GPC KF-801 2
Detector: differential refractometer
Eluent solvent: tetrahydrofurun
Temperature: 35° C.
Sample concentration: 0.1 weight %
Standard sample: various monodisperse polystyrenes ((Mw/Mn)=1.14(Max)), TSK standard POLYSTYRENE (made by TOSOH CORP.)

<Permanent Compression Strain>

The following standard compounds are subjected to primary press vulcanization and secondary oven vulcanization under the standard vulcanizing conditions to prepare an O ring, and a permanent compression stain after a primary press vulcanization and a permanent compression strain (Cs) after secondary oven vulcanization are measured (measure samples which are left for 30 minutes in a room at a constant temperature after holding them for 72 hours at 200° C. under pressuring with 25% compression) according to JIS-K6262.

(Standard Amount)

| Polymer | 100 parts by weight |
|---|---|
| Triallylisocyanurate(TAIC) | 4 parts by weight |
| Perhexa25B | 1.5 parts by weight |
| Carbon black MT-C | 20 parts by weight |

(Standard Vulcanization Conditions)
Kneading method: roll kneading
Press vulcanization: 10 minutes at 160° C.
Oven vulcanization: 4 hours at 180° C.

<100% modulus (MlOO)>

The standard compound is subjected to primary press vulcanization and secondary oven vulcanization under the standard vulcanization conditions to prepare a 2 mm thickness sheet, and the 100% modulus is measured according to JIS-K6251.

<Tensile Strength at Break (Tb) and Tensile Elongation at Break (Eb)>

The standard compound is subjected to primary press vulcanization and secondary oven vulcanization under the standard vulcanization conditions to prepare a 2mm thickness sheet, and the tensile strength at break and the tensile elongation at break are measured according to JIS-K625 1.

<Hardness (Hs)>

The standard compound is subjected to primary press vulcanization and secondary oven vulcanization under the standard vulcanization conditions to prepare a 2mm thickness sheet, and the hardness is measured according to JIS-K6253.

<Vulcanization Properties>

The vulcanization curve at 170° C. is found in primary press vulcanization using JSR model curastometer II and V, and the minimum viscosity (ML), the degree of vulcanization (ML), the induction time ($T_{10}$) and the optimum vulcanization time ($T_{90}$) are found.

<Chemical Composition Analysis>

The chemical composition analysis was conducted by $^{19}F$-NMR (made by Bruker BioSpin K.K. AC300P).

<Elemental Analysis>

CHN CORDER MT-5 made by J-SCIENCE LAB Co.,Ltd.
F ion meter microprocessor ionanalyzer/901 made by Orion Corp. Ltd.

EXAMPLE 1

According to the method described in Japanese Unexamined Patent Publication No. 62-12734, $ICH_2CF_2CF_2OCF(CF_3)CF_2OCF(CF_3)COOCH_3$ (IFM-1) was synthesized. A stainless autoclave was charged with 58.2 g of IFM-1, 600 g of vinylidenefluoride (VdF) and 1500 g of hexafluoropropylene after conducting nitrogen substitution, the temperature was maintained at 25° C., and initiated polymerization by adding 1.6 mL of $[Cl(CF_2CFCl)_2CF_2COO-]_2$ (DLP) diluted with 20% by weight of $F(CF_2)_6F$. After reacting for 30 hours, more 1.6 mL of DLP was added, and when pressure decreased to 1.65 MPa from 1.85 MPa after 66 hours, a gas monomer was discharged, and the reaction of polymerization was finished. 255 g of polymer A in the state of starch syrup was obtained. The composition of polymer A was VdF/HFP=80/20, number average molecular weight was 2500, weight average molecular weight was 4800, and Mw/Mn was 1.92, which were measured by GPA and converted with polystylene.

Subsequently, the polymer which was separated into two phases in the early stage became one uniform phase and the viscosity was increased by agitating 20 g of a liquid silicone rubber DMS-A15 (made by Gelest, Inc., molecular weight 3000, $NH_2$ concentration of 1.1% by weight) containing an amino group at the end of the polymer and a dimethylsiloxane unit and 47 g of the above mentioned polymer A for approximately one hour at 50° C. An unreacted polymer A was eliminated by washing this polymer with acetone and 61 g of a block polymer having respective segment of a fluorine rubber and a silicone rubber was obtained.

0.4 g of triallylisocyanate (TAIC: made by Nippon Kasei chemical Co., Ltd.) and of 0.15 g of perhexa2.5 B (made by NOF Corp.) are mixed with 10 g of the obtained fluorine rubber silicone rubber block polymer, and the hardness behavior was examined by JSR model curastometer. 1.9 minutes of the induction time, 3.5 minutes of the optimum vulcanization time, 0.0 kgf of the minimum torque, 1.4 kgf of the maximum torque were read, and a transparent and bistered cured compound was obtained.

EXAMPLE 2

20 g of the fluorine rubber silicone rubber block polymer obtained in Example 1, 90 g of a peroxide-vulcanizable fluorine rubber B (Daiel G801, made by Daikin Industries, Ltd.) and 90 g of a peroxide-vulcanizable silicone rubber C (available from DMS-V42 Gelest, Inc.) were dispersed by rolling and a curable composition was obtained by mixing 8 g of TAIC, 3 g of perhexa 25b and MT carbon (N900, made by Cancorb Ltd.). A crosslinked sheet was obtained by heat treating this composition at 180° C. for 4 hours in the oven after press vulcanization at 160° C. for 15 minutes. Mechanical properties of this crosslinked sheet were 1.2 MPa of 100% modulus, 5.5 MPa of the tensile strength, 480% of the elongation and 65 of the hardness (JIS A).

INDUSTRIAL APPLICABILITY

According to the present invention, a graft or a block polymer comprising at least one kind of a silicone rubber segment and at least one kind of a fluorine elastomer segment, which is excellent in oil resistance, heat resistance, chemical resistance, how hardness and cold resistance, can be obtained.

The invention claimed is:

1. A graft or a block polymer comprising at least one kind of a silicone rubber segment and at least one kind of fluorine containing elastomer segment, the graft or the block polymer being obtained by reacting a fluorine containing compound having a fluorine containing elastomer segment with a silicone rubber having at least one amino group, wherein the fluorine containing compound is obtained by polymerizing a fluorine containing monomer with a fluorine containing compound represented by the formula (1):

wherein $X^1$ is an iodine atom or a bromine atom, $R_f^1$ is a bivalent fluorine containing alkylene group having 1 to 30 carbon atoms and possibly containing an oxygen atom, and $R^1$ is an alkyl group having 1 to 3 carbon atoms.

2. The graft or the block polymer of claim 1, wherein the fluorine containing elastomer segment is an elastomer segment comprising a vinylidene fluoride or an elastomer segment comprising tetrafluoroethylene.

3. The graft or the block polymer of claim 1, wherein the silicone rubber segment has a unit of dimethylsiloxane and/or methyl-3,3,3-trifluoropropylsiloxane.

4. The graft or the block polymer of claim 2, wherein the silicone rubber segment has a unit of dimethylsiloxane and/or methyl-3,3,3-trifluoropropylsiloxane.

* * * * *